Figure 2:
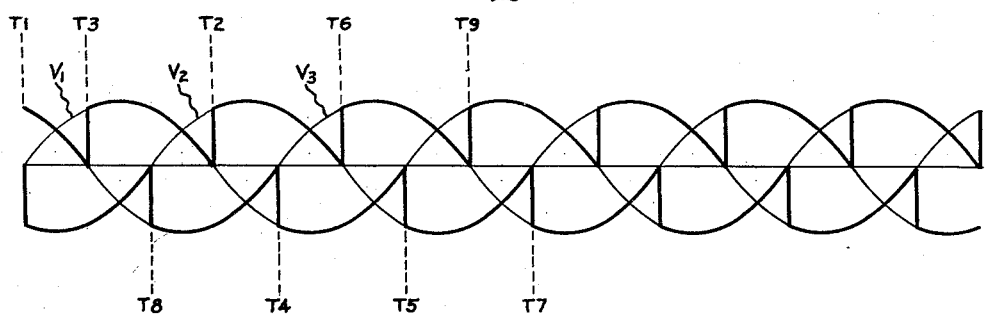

May 11, 1954   R. A. BLACK   2,678,418
CONTROL SYSTEM FOR A PLURALITY OF ELECTRIC CIRCUITS
Filed July 25, 1951   2 Sheets-Sheet 1
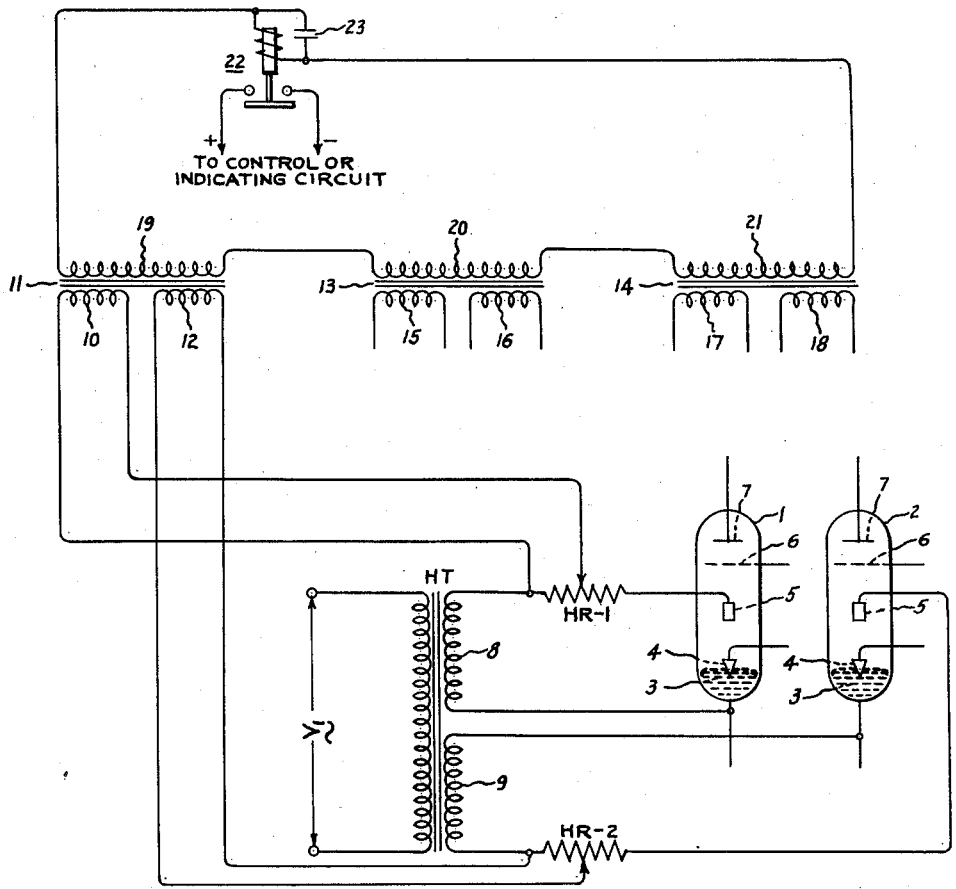
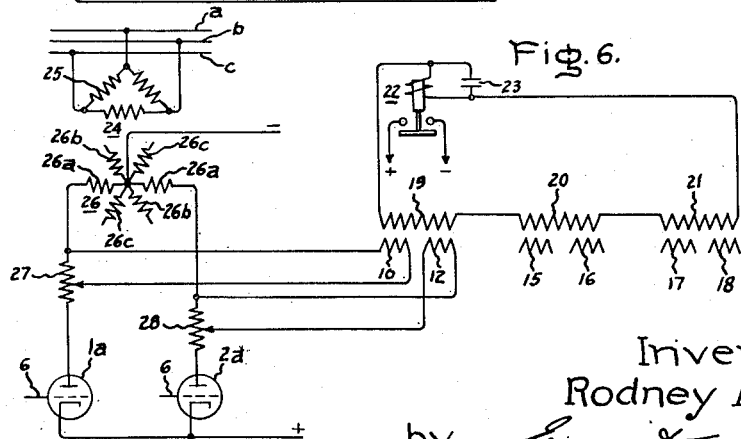
Inventor:
Rodney A. Black,
by Ernest C. Britton
His Attorney.

Inventor:
Rodney A. Black,
by
His Attorney.

Patented May 11, 1954

2,678,418

UNITED STATES PATENT OFFICE 2,678,418

CONTROL SYSTEM FOR A PLURALITY OF ELECTRIC CIRCUITS

Rodney A. Black, Schenectady, N. Y., assignor to General Electric Company, a corporation of New York Application July 25, 1951, Serial No. 238,541

6 Claims. (Cl. 321—12)

1

This invention relates to control systems for a plurality of electric circuits, and more particularly to misfire detecting control systems for a plurality of electric discharge devices connected in a polyphase circuit, such as used, for example, for rectifying or converter purposes. The invention is applicable to electric discharge devices or valves in which current flow is by an electric discharge across a space in an evacuated envelope and in which current flow is initiated periodically by a control element. Such valves may be of the vacuum or so-called hard-tube type or might be of the gaseous discharge type such as an ignitron or a thyratron. The invention has been found to be particularly useful in valves of the ignitron type have a make-alive immersion ignition element and will be described in connection with an ignitron converter system and also in connection with a converter using vacuum type valves.

During its operation an electric vapor discharge device of the make-alive type, such as an ignitron, may fail to conduct current because of a fault in the ignitor firing circuit or in one of the ignitors. Such failure to conduct current is commonly known as misfire. Failure may be occasional or persistent. Persistent excitation failure or misfire of an electric vapor discharge device results among other things in improper functioning of the system in such a way that reduced efficiency of operation is a result. In any case, an indication of faulty operation is desirable so that the fault may be remedied and normal operation continued. Various arrangements have been proposed or used heretofore for detecting misfires due, for example, to excitation failures or to leaks in the valve envelope in various types of vapor discharge devices. One such arrangement incorporates a tuned relay circuit responsive to an alternating current ripple voltage in the direct current circuit or in the interphase transformer connection.

One object of my invention is to provide a system for detecting such misfires which is more satisfactory under various conditions of operation and which is adaptable for use in the various forms of power transformer connections and valve arrangements encountered in practice.

Another object of this invention is to provide an improved misfire detecting system for electric valve systems wherein a relatively few components are required and which is characterized by simplicity of construction and a high degree of reliability in performance as compared with presently known arrangements.

Another object of this invention is to provide

2 an improved misfire detecting arrangement which is readily adaptable to various polyphase arrangements, irrespective of the number of valves or phases.

A further object of the invention is to provide a misfire detector which requires no factory adjustment and which embodies a minimum of moving parts.

A still further object of this invention is the provision of a misfire detector which is not responsive to wide-phase unbalances and, hence, which is relatively free from false operation.

In carrying out the invention in one form as applied to a polyphase converter, a signal voltage of predetermined value is obtained from each discharge device during each half cycle of its operation, this voltage being zero during the half cycles in which the discharge device is not conducting. These signal voltages are combined in series in predetermined phase relations by means of suitable transformers in an integrating or summarizing circuit containing a tuned relay. During normal operation, high-frequency resultant voltage is produced in the relay circuit to which high frequency voltage the relay is not responsive. When one of the discharge devices fails to fire and its signal voltage consequently becomes zero, the resultant of the signal voltages has a low frequency component which effects operation of the relay to perform a control or indicating operation.

The invention will be better understood from the following description taken in conjunction with the accompanying drawings in which Fig. 1 is a schematic representation of one embodiment of the invention, in which Figs. 2–5 are a family of curves to aid in understanding the operation of the arrangement shown in Fig. 1, and in which Fig. 6 is a schematic representation of a modification of the system shown in Fig. 1.

In Fig. 1 a pair of electric discharge devices or valves of the ignitron type are indicated by the numerals 1 and 2. Each of these valves is provided with a mercury pool cathode 3, an ignitor element 4, an auxiliary electrode or holding anode 5, and a control grid 6. Each of the valves 1 and 2 is also provided with a plate member 7. The anode voltages applied to the valves 1 and 2 are displaced from each other by 180°. As is well known, suitable circuits (not shown) are provided for controlling the energization of ignitors 4 and control grids 6. Examples of such circuits can be found in Mittag Patent 2,544,345, granted March 6, 1951, and in United States Patent 2,517,129—Mulhern, granted August 1, 1950, both of which are assigned to the assignee of this invention. Since the particular form of the circuits for controlling elements such as 4 and 6 form no part of the present invention and are well known in the art, they have been omitted from the drawing for the sake of simplicity.

Generally speaking, a cathode spot is established on the mercury pool cathodes 3 by means of a pulse of current supplied through ignitors 4. This cathode spot is maintained by means of the holding anode 5 for a sufficient period of time until the grid 6 becomes sufficiently positive to cause conduction through the valve, holding anode 5 being sufficiently positive relative to the cathode for this purpose for a portion of alternating half cycles. Suitable energization for the holding anodes 5 may be accomplished by means of a holding anode transformer HT having a primary winding and a pair of secondary windings 8 and 9. Secondary winding 8 supplies energy to the holding anode 5 of valve 1 through the resistor HR-1 while secondary winding 9 controls the energization of holding anode 5 of valve 2 through the circuit including resistor HR-2. Voltage $V_1$ for each pair of valves is supplied from the same phase used to supply the anodes 7 of each pair of valves. These resistors HR-1 and HR-2 are sometimes referred to in the claims as condition-responsive elements and are provided for the purpose of giving a signal voltage resulting from current flow which voltage is used as an indication of normal operation of the associated valve.

As is well understood in the art, the valves 1 and 2 are arranged to conduct alternate half-cycles of current through one phase of a polyphase arrangement using a number of pairs of valves, such as 1 and 2. From the description thus far it will be understood that each half-cycle of conduction through each of the valves 1 and 2 will cause a current to flow through the associated holding anode resistor HR-1 or HR-2 due to the action of the associated holding anode 5.

As is indicated in Fig. 1, a voltage derived from resistor HR-1 is supplied to primary winding 10 of transformer 11 through a sensing circuit, while a signal derived from current flowing through resistor HR-2 is supplied to primary winding 12 of transformer 11 through a sensing circuit. Thus, with the valves 1 and 2 operating normally, approximately 180° out of phase, a voltage will be supplied alternately to the windings 10 and 12.

Since the invention is applicable to polyphase systems, I have indicated in addition to the transformer 11 two other transformers 13 and 14 which are respectively provided with a pair of primary windings 15 and 16, and 17 and 18. Thus, it will be understood that a three-phase arrangement utilizes six ignitron valves, the holding anode resistors of valves other than 1 and 2 being used to energize the primary windings of transformers 13 and 14 in the same manner as is indicated on the drawing in connection with transformer 11. It will be understood that the voltages supplied to the primary windings of each transformer 19, 20 and 21 are 180° out of phase and the voltages in the secondary windings 19, 20 and 21 are 120° out of phase.

As will be readily understood from Fig. 1, the windings 19, 20 and 21 of transformers 11, 13 and 14 respectively are arranged in series with the coil of a relay 22. Suitable tuning for this relay is achieved by the choice of a capacitor 23 which as is indicated in Fig. 1 is connected in parallel with the coil of relay 22.

The contacts of relay 22 as indicated in Fig. 1 could be used to control a control circuit for a circuit interrupter arranged to control the current through the cathode-anode circuits of the valves such as 1 and 2, or could be used to sound an alarm or to actuate some other appropriate signal.

Generally speaking, when all valves of a polyphase system are conducting current normally, the holding anodes of all such valves are traversed by current pulses according to the conducting periods of their associated tubes. These current pulses develop voltage differences across the holding anode resistors such as HR-1 and HR-2 so that a plurality of signals are supplied to the primary windings of transformers such as 11, 13 and 14. For a three-phase system the frequency of the signal supplied to the primary windings of these transformers is a fundamental, and the frequency of the signal supplied to the summarizing circuit is a harmonic the lowest order of which is triple the frequency of the fundamental frequency of the anode-cathode conduction period of the valves. Should one or more of the valves fail to fire, its associated holding anode will not be energized and no voltage will be developed across the resistor in the holding anode circuit. This failure to fire on the part of one or more of the valves causes the current in the summarizing or integrating circuit to have a component having the fundamental frequency of the system as well as components having harmonics of that frequency. Thus, the magnitude of current in the summarizing or integrating circuit during misfire conditions is substantially greater due to the presence of a component at fundamental frequency than the magnitude of current during normal conditions when the frequency is a multiple of the fundamental frequency. In this way relay 22, being tuned to the fundamental frequency, is actuated in response to misfire conditions.

The above described operation will be better understood by referring to the curves, Figs. 2-5. In Fig. 2 the alternating current voltage supplied to the transformer HT of each phase of a three-phase system is respectively indicated by the sine wave voltages $V_1$, $V_2$, and $V_3$. The heavy portions of these curves are indicative of the voltage across the corresponding holding anode resistor. For example, the positive half-cycle of the voltage $V_1$ supplied by the transformer HT is indicated on Fig. 2 between the times T1 and T2. Resistor HR-1 does not conduct current until time T3. Thus, since the current in resistor HR-1 is in phase with the voltage, the heavy portion of the curve in Fig. 2 from time T3 to time T2 indicates the voltage across holding anode resistor HR-1. In like manner, the heavy portion of the negative half-cycle of the wave $V_1$ between the time T4 and the time T5 is representative of the voltage across holding anode resistor HR-2. It will be understood that the voltages $V_2$ and $V_3$ indicated on Fig. 2 would be voltages corresponding to $V_1$ as shown on Fig. 1, except that the voltages $V_2$ and $V_3$ would be supplied to the holding anode circuits of two other pairs of valves comprising the remaining two phases of a three-phase system. Thus, current flows to the holding anode circuit energized by voltage $V_2$ for the positive half-cycle between time T2 and time T6, while current flows during the negative half-cycle of voltage $V_2$ between times T5 and T7. It will also be understood that the conducting period of the holding anodes energized by the voltage V3 occurs between the time T8 and the time T4 for the negative half-cycle and between the time T6 and the time T9 for the positive half-cycle. Thus each control circuit is normally traversed by a current impulse during a different portion of each phase cycle of the polyphase circuit interconnected with the valves.

Figure 3:
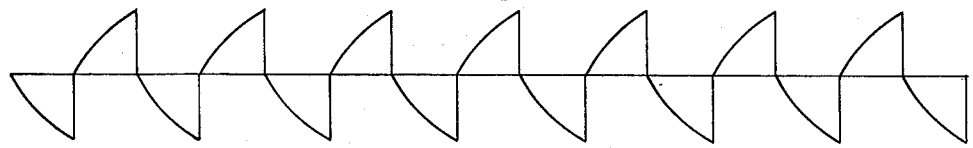

The wave shape and frequency of the voltage in the integrating or summarizing circuit comprising the coil of relay 22 and transformer windings 19, 20, and 21 is generally as indicated in Fig. 3 for normal or proper operation of the ignitrons. This curve in Fig. 3 is obtained by merely adding the instantaneous values of the various voltages as shown in Fig. 2. From Fig. 3 it will be understood that the frequency of the voltage in the integrating or summarizing circuit is three times that of the fundamental frequency represented by the curves $V_1$, $V_2$, and $V_3$ in Fig. 2. Obviously, Fig. 3 represents normal conditions when all of the six valves of the three-phase system are operating normally.

Figure 4:
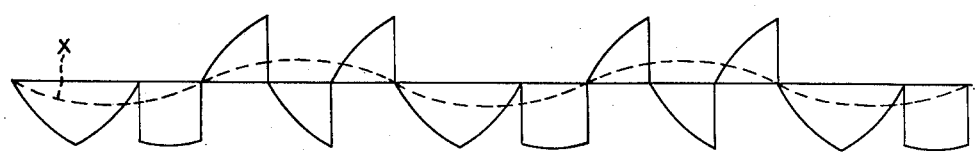

Fig. 4 represents the condition which exists when one holding anode, such as holding anode 5 of valve 1, fails to conduct current. Fig. 4 merely represents the sum of the instantaneous values of the voltages indicated in heavy lines in Fig. 2 with the positive half-cycle of the voltage $V_1$ eliminated. From Fig. 4 it will be understood that a curve approaching a sinusoidal curve can be indicated such as by the dotted-line curve X and that this curve has a frequency which is the fundamental frequency. Thus, failure of one holding anode to conduct produces a resultant voltage having a component at the fundamental frequency such as dotted-line curve X for the summarizing or integrating circuit and an increase in current flows through the relay 22 so as to cause the relay to actuate its contacts.

Figure 5:
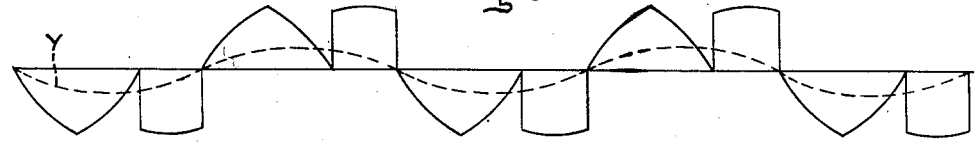

The curve shown in Fig. 5 represents the condition wherein both holding anodes 5 of a pair of valves such as 1 and 2 fail to conduct. In this event, the resultant wave shape of voltage which appears in the summarizing or integrating circuit also has a fundamental frequency as is indicated by the dotted line curve Y. It will be understood, of course, that Fig. 5 represents merely the algebraic sum of the instantaneous values of voltage shown in Fig. 2 with both the positive and negative half-cycles of the voltage $V_1$ eliminated.

While the arrangement as described above is shown in conjunction with electronic devices of the ignitron type, it will be understood that the invention is applicable to electronic devices of other types, such as thyratrons, for example, and could even be used in conjunction with vacuum-type valves which are not provided with a vaporizable medium therein.

In the system shown in Fig. 6 the condition-responsive elements 27 and 28 correspond to the resistors HR-1 and HR-2 of Fig. 1 and are connected in the anode circuits of valves $1a$ and $2a$. Voltages are drawn from these elements to produce a fundamental frequency in the summarizing circuit so that when a misfire condition occurs actuation of relay 22 is effected. In Fig. 6 the alternating current circuit comprises the polyphase system of conductors $a$, $b$, and $c$ to which a transformer 24 having one winding 25 and another winding 26 is connected. One phase such as $26a$ of winding 26 is connected with the anodes of valves $1a$ and $2a$. It will be understood that the phase windings $26b$ and $26c$ would be connected respectively to other pairs of valves such as $1a$ and $2a$ which are not shown. Such a system could operate as a rectifier or as an inverter. Windings 15, 16, 17, and 18 would be energized from elements such as 27 and 28 associated with the remaining two pairs of valves which are not shown.

While I have shown and described particular embodiments of my invention, it will be obvious to those skilled in the art that various changes and modifications may be made without departing from the invention and I, therefore, intend in the appended claims to cover all such changes and modifications as fall within the true spirit and scope of my invention.

What I claim as new and desire to secure by Letters Patent of the United States is:

1. A control system for use in conjunction with a plurality of circuits each of which is normally traversed by a current impulse corresponding to a predetermined half cycle of one phase of a polyphase circuit, said system comprising a resistor connected in each of the plurality of circuits, a plurality of sensing circuits arranged one with each of said resistors and each being connected to be energized or deenergized in accordance with current flow or cessation of current flow in its associated resistor, and a summarizing circuit energized by said sensing circuits, the voltage in said summarizing circuit having a normal frequency which is a multiple of the frequency of the polyphase circuit and which includes a component at the fundamental frequency of the polyphase circuit upon failure of current impulses in any control circuit, said summarizing circuit being tuned to said fundamental frequency so that a larger than normal current flows therein upon failure of current impulses in any control circuit, and means responsive to said larger current for performing a control or indicating operation.

2. A control system for use in conjunction with a plurality of circuits each of which is normally traversed by a current impulse corresponding to a predetermined half cycle of one phase of a polyphase circuit, said system comprising an electric condition responsive element connected in each of the plurality of circuits, a plurality of sensing circuits each interconnected with one of said condition responsive elements and respectively energized and deenergized in response to the flow of current and the cessation of the flow of current in the associated element, transformer means having a secondary circuit and a plurality of primary circuits, each of said primary circuits being connected with one of said sensing circuits, and means including a relay circuit energized by said secondary circuit for performing a control or indicating operation, the voltage in said secondary and relay circuits having a normal frequency which is a multiple of the frequency of the polyphase circuit and said relay circuit being tuned to a predetermined frequency lower than said normal frequency.

3. A protective system for a polyphase electric valve converter of the type having a plurality of make-alive valves wherein each valve is provided with an anode, a cathode, an auxiliary electrode circuit and a make-alive electrode for the cathode which is arranged to be supplied with periodic current impulses for establishing a cathode spot on the cathode said system comprising, a plurality of electric condition responsive elements arranged one in each auxiliary electrode circuit, a plurality of sensing circuits each interconnected with one of said elements, said sensing circuits being respectively energized and deenergized in response to the flow of current and the cessation of the flow of current in the associated auxiliary electrode circuit, and a summarizing circuit energized by said sensing circuits, the voltage in said summarizing circuit having a normal frequency which is a multiple of the fundamental frequency of the polyphase converter circuit and having a component at a lower frequency than said normal frequency in response to failure of a current impulse in any auxiliary electrode circuit, and means responsive to said lower frequency for performing a control or indicating operation.

4. A protective system for a polyphase electric valve converter of the type having a plurality of make-alive valves wherein each valve is provided with an anode, a cathode, an auxiliary electrode circuit and a make-alive electrode for the cathode which is arranged to be supplied with periodic current impulses for establishing a cathode spot on the cathode said system comprising, a plurality of electric condition responsive elements arranged one in each auxiliary electrode circuit, a plurality of sensing circuits each interconnected with one of said elements, said sensing circuits being respectively energized and deenergized in response to the flow of current and the cessation of the flow of current in the associated auxiliary electrode circuit, and a summarizing circuit energized by said sensing circuits, the voltage in said summarizing circuit having a normal frequency which is a multiple of the frequency of the polyphase converter circuit and having a component at a lower frequency than said normal frequency in response to failure of a current impulse in any auxiliary electrode circuit, and means including a relay tuned to said lower frequency for performing a control or indicating operation.

5. A protective system for a polyphase electric valve converter of the type having a plurality of make-alive valves wherein each valve is provided with an anode, a cathode, an auxiliary electrode circuit and a make-alive electrode for the cathode which is arranged to be supplied with periodic current impulses for establishing a cathode spot on the cathode, said system comprising, a plurality of resistors arranged one in each auxiliary electrode circuit, a plurality of sensing circuits each interconnected with one of said resistors, said sensing circuits being respectively energized and deenergized in response to the flow of current and the cessation of the flow of current in the associated auxiliary electrode circuit, transformer means having a secondary circuit and a plurality of primary circuits, each of said primary circuits being connected with one of said sensing circuits so as to be energized and deenergized thereby, and means including a relay circuit energized by said secondary circuit for performing a control or indicating operation, the voltage in said secondary and relay circuits having a normal frequency which is a multiple of the frequency of the polyphase circuit and said relay circuit being tuned to a predetermined frequency other than said normal frequency.

6. A protective system for a polyphase electric valve system having a pair of electric valves for each phase, each of said valves having a control circuit normally traversed by a current impulse corresponding to a predetermined half cycle of one phase of a polyphase circuit, said protective system comprising a resistor connected in each of said control circuits for producing signal voltages 180° out of phase in the pair of resistors of each of said pairs of valves, transformer means connected to each of said pairs of resistors, and connections for connecting said transformer means in series circuit relation in such manner that the signal voltages from the pairs of said resistors are 120° out of phase relation with each other to provide a resultant voltage having a frequency three times the frequency of the signal voltage and upon failure of one signal voltage a resultant lower frequency voltage is produced, and control means responsive only to said lower frequency voltage connected to said transformer means.

References Cited in the file of this patent
UNITED STATES PATENTS

| Number | Name | Date |
|---|---|---|
| 2,057,531 | Livingston | Oct. 13, 1936 |
| 2,123,859 | Winograd | July 12, 1938 |
| 2,141,927 | Morack | Dec. 27, 1938 |
| 2,169,866 | Bedford | Aug. 15, 1939 |
| 2,285,556 | Batten | June 9, 1942 |
| 2,305,380 | Edwards | Dec. 15, 1942 |
| 2,404,614 | Borst | July 23, 1946 |